United States Patent
Yi et al.

(10) Patent No.: US 10,026,945 B2
(45) Date of Patent: Jul. 17, 2018

(54) RECHARGEABLE BATTERY

(71) Applicant: Samsung SDI Co., Ltd., Yongin-si, Gyeonggi-do (KR)

(72) Inventors: Jeong-Doo Yi, Yongin-si (KR); Jun-Won Suh, Yongin-si (KR); Ju-Hyeong Han, Yongin-si (KR); Ju-Hee Sohn, Yongin-si (KR); Hyun-Hwa Song, Yongin-si (KR); Seok-Hun Hong, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 266 days.

(21) Appl. No.: 14/949,504

(22) Filed: Nov. 23, 2015

(65) Prior Publication Data
US 2016/0268580 A1    Sep. 15, 2016

(30) Foreign Application Priority Data

Mar. 13, 2015   (KR) .................. 10-2015-0035255

(51) Int. Cl.
*H01M 2/20* (2006.01)
*H01M 2/26* (2006.01)

(52) U.S. Cl.
CPC .............. *H01M 2/26* (2013.01); *H01M 2/20* (2013.01); *H01M 2/202* (2013.01)

(58) Field of Classification Search
CPC ........... H01M 2/20; H01M 2/202; H01M 2/26
See application file for complete search history.

(56) References Cited

U.S. PATENT DOCUMENTS

| | | | | |
|---|---|---|---|---|
| 2001/0051298 | A1* | 12/2001 | Hanafusa | H01M 2/0207 429/162 |
| 2003/0232243 | A1* | 12/2003 | Hong | H01M 2/1653 429/161 |
| 2005/0014036 | A1* | 1/2005 | Kim | H01M 2/021 429/7 |
| 2013/0011700 | A1* | 1/2013 | Park | H01M 2/1077 429/7 |
| 2016/0118640 | A1* | 4/2016 | Miyake | H01M 2/26 429/163 |

FOREIGN PATENT DOCUMENTS

| JP | 2000-215877 A | 8/2000 |
|---|---|---|
| KR | 10-2008-0045450 A | 5/2008 |

* cited by examiner

*Primary Examiner* — Jonathan G Jelsma
(74) *Attorney, Agent, or Firm* — Knobbe Martens Olson & Bear LLP (57) ABSTRACT

A rechargeable battery is disclosed. In one aspect, the battery includes an electrode assembly including a first electrode, a separator, and a second electrode stacked together, wherein the first electrode, the separator, and the second electrode are fixed at a fixing portion on a first side of the electrode assembly. A case accommodates the electrode assembly; and first and second electrode tabs are respectively connected to the first and second electrodes and extend from a first end portion of the case so as to form a tab gap therebetween. Each of the first and second electrode tabs includes first and second adhesive portions opposing each other, at least one wire having a bent portion interconnecting the first and second adhesive portions, and an insulating member covering the bent portion.

21 Claims, 11 Drawing Sheets

RECHARGEABLE BATTERY

CROSS-REFERENCE TO RELATED APPLICATION

This application claims priority to and the benefit of Korean Patent Application No. 10-2015-0035255 filed in the Korean Intellectual Property Office on Mar. 13, 2015, the entire contents of which are incorporated herein by reference.

BACKGROUND

Field

The described technology generally relates to a rechargeable battery.

Description of the Related Technology

With the advancement of mobile device technology, demand for rechargeable batteries has been increasing. A rechargeable battery differs from a primary battery in that it can be repeatedly charged and discharged, while the latter cannot be recharged.

One important aspect in manufacturing rechargeable batteries is energy density because these batteries are embedded in small electronic devices to be used as the power source.

In this case, the volume or capacity and form factor of the power source are determined in part by the size of the electronic device. According to a recent trend of shrinking information technology (IT) devices, the size of the power source is also becoming smaller.

However, the market demand is that the rechargeable battery last longer with increased capacity despite a reduced size. Accordingly, unnecessary space in the rechargeable battery should be reduced to make a compact size. Furthermore, with the development of flexible electronic devices, the rechargeable battery also needs to be flexible.

A pouch type of rechargeable battery having such characteristics has been developed. The pouch type of rechargeable battery typically includes i) an electrode assembly formed by stacking a positive electrode, a separator, and a negative electrode to perform charging and discharging operations, ii) a pouch in which the electrode assembly is accommodated, and iii) electrode tabs through which the electrode assembly is drawn out of the pouch.

An electrolyte solution is provided in an empty space between the electrode assembly and the pouch, and a vacuum state is maintained inside the rechargeable battery to minimize an overall volume.

However, when the flexible rechargeable battery is exposed to repeated bending, loosely coupled parts can break as bending stress is applied to the pouch type of rechargeable battery.

The above information disclosed in this Background section is only for enhancement of understanding of the background of the disclosure and therefore it may contain information that does not form the prior art that is already known in this country to a person of ordinary skill in the art.

SUMMARY OF CERTAIN INVENTIVE ASPECTS

One inventive aspect relates to a flexible rechargeable battery that is not easily ruptured by repeated bending operations.

Another aspect is a flexible rechargeable battery that includes: an electrode assembly formed by stacking a first electrode, a separator, and a second electrode and fixing the first electrode, the separator, and the second electrode by a fixing portion at one side; a case in which the electrode assembly having a flexible property is accommodated; and first and second electrode tabs connected to the first and second electrodes and drawn out of one end portion of the case to form a tab gap therebetween, wherein each of the first and second electrode tabs includes a pair of adhesive portions, at least one or more wires having a bent portion interconnecting the adhesive portions, and insulating members surrounding the bent portions.

Each of the first and second electrodes can include a coated region and an uncoated region, and each of the uncoated regions of the first and second electrodes can be electrically coupled to either one of the pair of adhesive portions.

The bent portion can be formed with bends that are perpendicular to one of surfaces of the uncoated regions of the first and second electrodes.

The bent portion can be formed with bends that are parallel to one of surfaces of the uncoated regions of the first and second electrodes.

One surface of the adhesive portion connected to the uncoated region can have a smooth surface.

The adhesive portions can have a planar shape, and a plurality of bent portions can be connected between the planer adhesive portions.

The wire can be made of copper or aluminum.

The insulating member can be made of a material having elastic and flexible properties.

The insulating member can be a polymer material including silicon or a urethane.

The rechargeable battery can include a margin portion disposed between one end of the electrode assembly and an inner surface of the case to allow a length of the electrode assembly to vary at a free end thereof.

The margin portion can be disposed opposite to the first and second electrode tabs.

Another aspect is a rechargeable battery, comprising: an electrode assembly including a first electrode, a separator, and a second electrode stacked together, wherein the first electrode, the separator, and the second electrode are fixed at a fixing portion on a first side of the electrode assembly; a case accommodating the electrode assembly; and first and second electrode tabs respectively connected to the first and second electrodes and extending from a first end portion of the case so as to form a tab gap therebetween. Each of the first and second electrode tabs includes: first and second adhesive portions opposing each other; at least one wire having a bent portion interconnecting the first and second adhesive portions; and an insulating member covering the bent portion.

In the above rechargeable battery, each of the first and second electrodes includes a coated region and an uncoated region extending from the coated region, wherein the uncoated region is electrically connected to the first adhesive portion of the corresponding first or second electrodes tab.

In the above rechargeable battery, the bent portion of the at least one wire includes a plurality of bends extending in a direction substantially perpendicular to a surface of the corresponding uncoated region.

In the above rechargeable battery, the bent portion of the at least one wire is formed with a plurality of bends that are substantially parallel to one another.

In the above rechargeable battery, a surface of the first adhesive portion has a smooth surface.

In the above rechargeable battery, each of the first and second adhesive portions has a planar shape.

In the above rechargeable battery, the bent portion includes a plurality of bends connected between the first and second adhesive portions.

In the above rechargeable battery, the wire is formed of copper or aluminum.

In the above rechargeable battery, the insulating member is elastic and flexible.

In the above rechargeable battery, the insulating member is formed of a polymer material including silicon or a urethane.

The above rechargeable battery further comprises a margin portion formed between a second side of the electrode assembly and an inner surface of the case such that the electrode assembly extends into the margin portion when the rechargeable battery is bent.

In the above rechargeable battery, the margin portion is formed opposite to the first and second electrode tabs with respect to the electrode assembly.

Another aspect is a rechargeable battery, comprising: an electrode assembly including first and second electrodes; and first and second electrode tabs respectively connected to the first and second electrodes and extending from the electrode assembly. Each of the first and second electrode tabs includes: an insulating member; and a wire including first and second adhesive portions formed on opposing ends of the insulating member and at least one non-linear portion formed in the insulating member connected to each of the first and second adhesive portions.

In the above rechargeable battery, each of the first and second electrodes includes a coated region and an uncoated region extending from the coated region, wherein the uncoated region is electrically connected to the first adhesive portion of the corresponding first or second electrodes tab.

In the above rechargeable battery, the non-linear portion includes a plurality of non-linear portions interconnecting the adhesive portions.

In the above rechargeable battery, the non-linear portion includes curved portions.

In the above rechargeable battery, the curved portion forms a substantially wave shape.

In the above rechargeable battery, the non-linear portion includes bent and non-curved portions.

In the above rechargeable battery, the non-curved portions have a substantially saw tooth shape.

In the above rechargeable battery, the non-linear portion comprises a plurality of non-linear portions substantially parallel to each other.

According to at least one of the disclosed embodiments, when the electrode tab is formed to include the wire having the bent portions, the electrode tab can be easily bent or extended even when repeated bending operations are performed or a tensile force is applied. The rechargeable battery with minimized rupture in the electrode tab can be provided.

DETAILED DESCRIPTION OF CERTAIN INVENTIVE EMBODIMENTS

The present disclosure will be described more fully hereinafter with reference to the accompanying drawings, in which exemplary embodiments of the disclosure are shown. As those skilled in the art would realize, the described embodiments can be modified in various different ways, all without departing from the spirit or scope of the present disclosure. The drawings and description are to be regarded as illustrative in nature and not restrictive, and like reference numerals designate like elements throughout the specification. In this disclosure, the term "substantially" includes the meanings of completely, almost completely or to any significant degree under some applications and in accordance with those skilled in the art. Moreover, "formed on" can also mean "formed over." The term "connected" can include an electrical connection.

Figure 1:
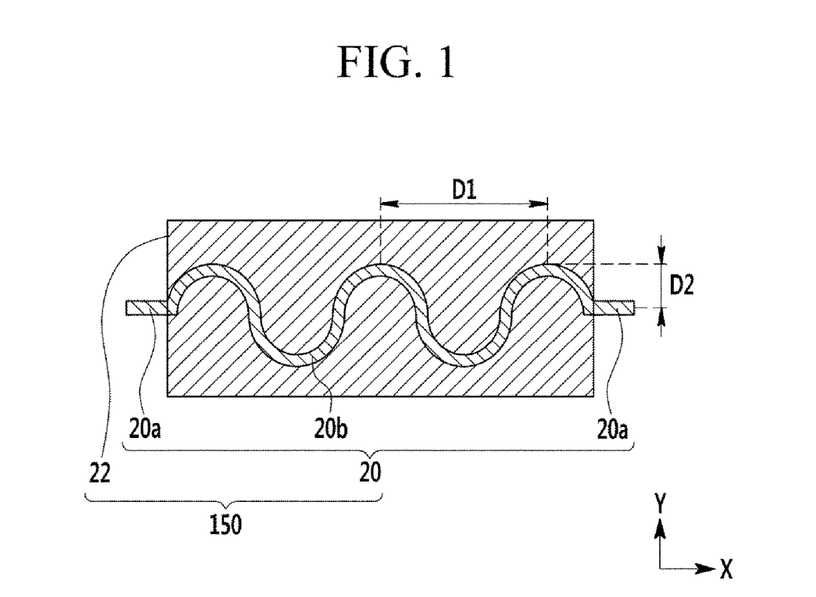
FIG. 1 is a schematic cross-sectional view of an electrode tab for a rechargeable battery according to an exemplary embodiment of the present disclosure.

As shown in FIG. 1, an electrode tab 150 for the rechargeable battery includes at least one wire 20 and an insulating member 22 enclosing the wire 20. A greater portion of the wire 20 can be buried in the insulating member 22 than its opposite ends that are exposed to the outside of the insulating member 22.

At its opposite ends, the wire 20 includes a pair of adhesive portions 20a formed outside of the insulating member 22, and a bent portion 20b interconnecting the adhesive portions 20a and formed inside of the insulating member 22.

The bent portion 20b can have multiple portions that are bent. If a length direction of the wire 20 is in an X-axis, the wire 20 can have bends that fluctuate along a thickness direction of the electrode tab 150, i.e., along a Y-axis.

Figure 2:
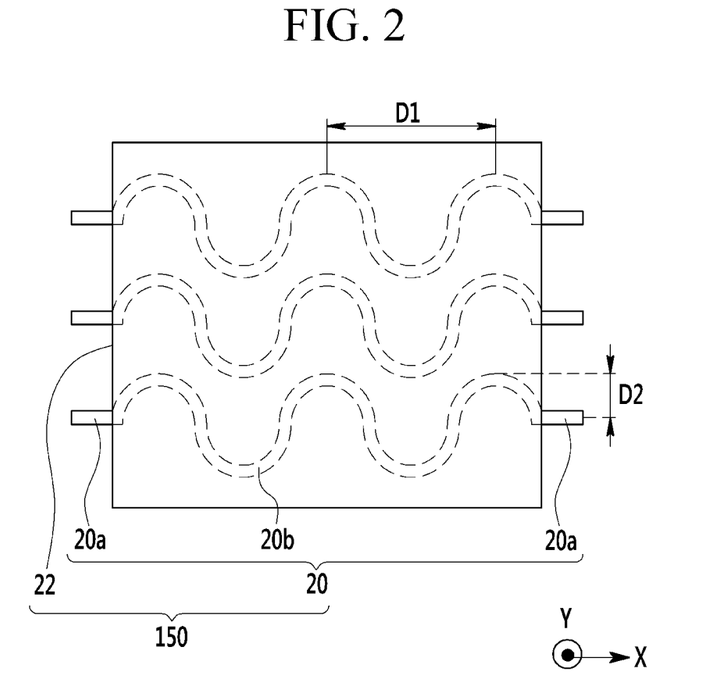
FIGS. 2, 3 and 4 are layout views of electrode tabs for rechargeable batteries according to other exemplary embodiments of the present disclosure.
Figure 3:
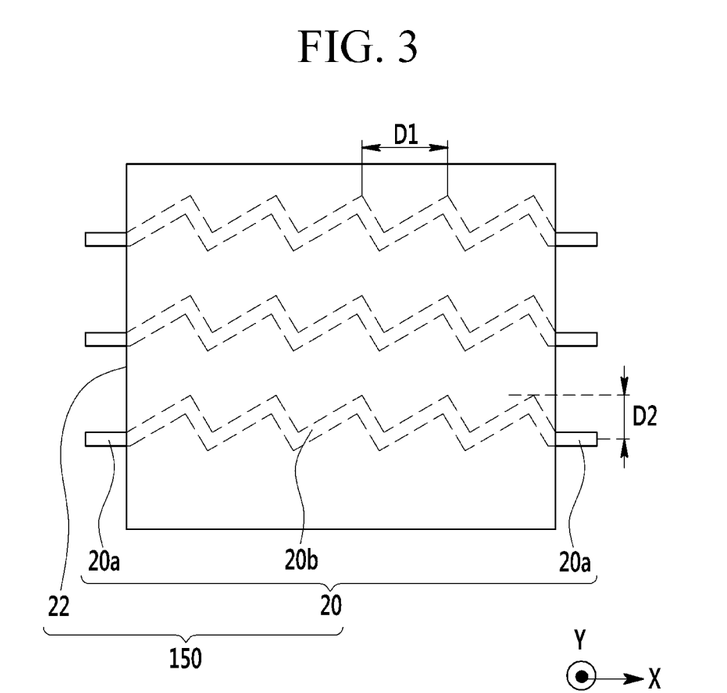

Alternatively, the wire 20 can have bends that fluctuate along a direction perpendicular to (or crossing) the Y-axis, as shown in FIGS. 2 and 3, while buried in the insulating member 22.

In FIGS. 1 to 3, a period D1 and a width D2 of the bent portion 20b of the wire 20 are illustrated such that they are fixed, but they are not limited thereto and can be changed. The width D2 of the bent portion in FIG. 1 is parallel to the Y-axis, while the width D2 of the bent portion in FIGS. 2 and 3 is perpendicular to the Y-axis. As shown in FIGS. 2 and 3, the bent portion 20b may be a wave shape or a saw tooth shape.

A cross-section of the wire 20 can have a circular or polygonal shape, but it is not limited thereto and can have a long narrow planar ribbon shape.

The adhesive portions 20a are electrically coupled to the rechargeable battery, and can have greater widths than the diameter of the bent portion 20b to increase a connecting area therebetween and to easily connect them. In addition, one surface of the adhesive portion 20a can be attached to an uncoated region of the rechargeable battery to be described later, and can have a smooth surface that has the same shape as a surface attached to the uncoated region.

Figure 4:
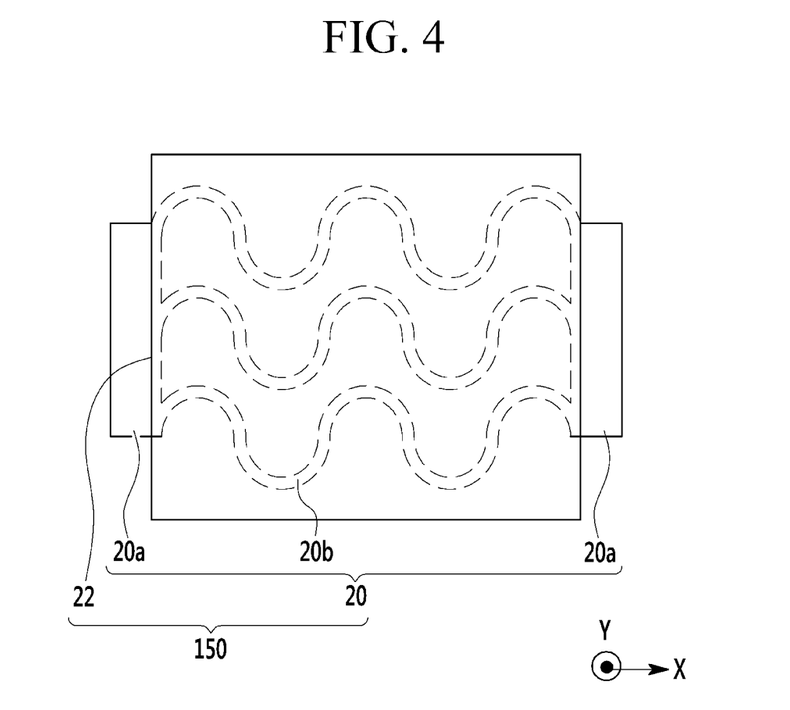

In addition, in the exemplary embodiment of the present disclosure, the adhesive portions 20a are illustrated such that they are respectively connected to the opposite ends of the bent portion 20b, but they are not limited thereto, and as shown in FIG. 4, a plurality of bent portions 20b can be connected to each other via the pair of planar adhesive portions 20a.

If the adhesive portions 20a are formed to have a planar shape, the area attached to the uncoated region increases, so resistance in the adhesive portion can decrease. Furthermore, the uncoated region and the electrode tab can be firmly combined, since the attached area therebetween increases. In addition, in FIG. 1, joining processes corresponding to the number of wires need to be performed, but in FIG. 4, only one joining process can be performed, thereby reducing manufacturing time.

The wire 20 can be formed of a metal having low resistance such as copper, aluminum, or silver.

The insulating member 16 can be formed of an insulating material that has elastic and flexible properties. For example, the insulating member 16 is formed of a polymer material including silicon or urethane.

A method of burying the wire 20 in the insulating member 22 can be performed in various ways. For example, after the insulating member formed with a groove having the same shape as the wire is formed using a mold and the like, the wire is inserted into the groove and an insulating material is then applied to cover the wire, thereby completing the electrode tab. Alternatively, before or after the insulating material is hardened after applying the insulating material, the wire can be disposed and an insulating material is then additionally applied and hardened, thereby completing the electrode tab.

When the electrode tab 150 is formed to include the curved wire 20 and the insulating member 22, as in the exemplary embodiment of the present disclosure, a rupture generated between the electrode tab and the electrode assembly by repeated bending or extending of the flexible rechargeable battery can be minimized.

Figure 5:
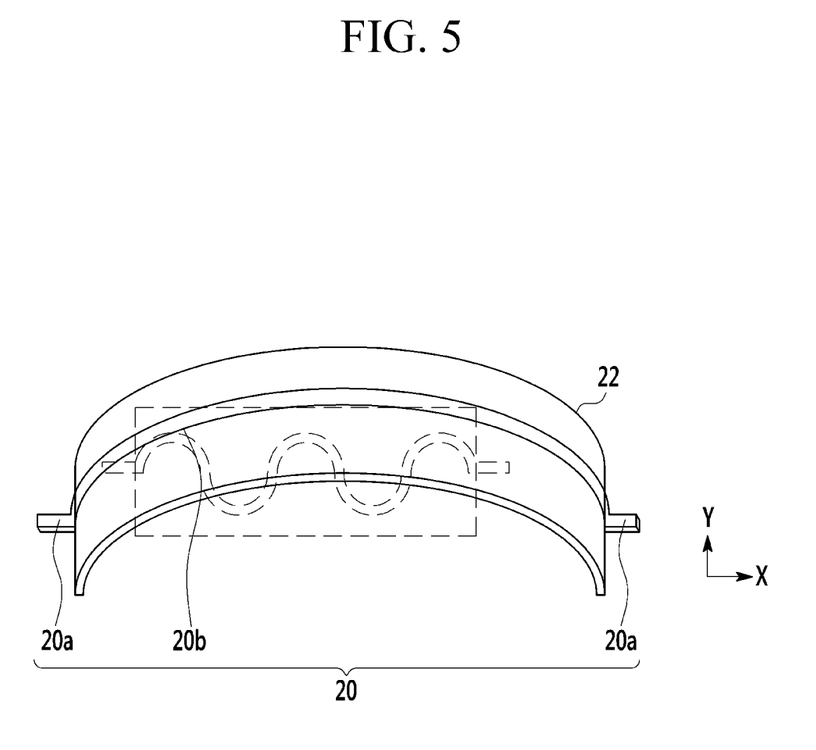
FIG. 5 is a perspective view of the electrode tab attached to the rechargeable battery according to the present disclosure being in a curved state.

FIG. 5 is a perspective view of the electrode tab attached to the rechargeable battery according to the present disclosure being in a curved state.

As shown in FIG. 5, the electrode tab attached to the rechargeable battery can be bent along with the rechargeable battery. In the curve state, the electrode tab can be bent along with the electrode assembly.

As such, when the electrode tab is curved, an outer lateral surface increases in size in accordance with a curvature radius of the insulating member 22. In this case, the internal wire 20 is extended along with the insulating member 16, and the bends of the bent portion are unbent and thus disappear. Then, the bends of the bent portion 20b of the wire are unbent to have a curvature radius that is similar to that of the insulating member 22. As such, in the present disclosure, since the bent portion is formed in the wire that is formed of a metal and is thus extended in accordance with the curvature radius when it is curved, the rupture of the electrode tab can be minimized even if the rechargeable battery is repeatedly bent.

A length of the bent portion 20b of the wire 20 is formed such that it is greater than a maximum allowable curvature radius of the insulating member 22. When the length of the bent portion of the wire 20 is less than the maximum allowable curvature radius, the bent portion cannot be bent by the curvature radius even if it is unbent, so the bent portion can be ruptured by a bending stress.

In the aforementioned exemplary embodiment, a case in which the rechargeable battery is bent has been described, but the same effect can be anticipated when the rechargeable battery is extended.

Now, the rechargeable battery including the aforementioned electrode tab will be described in detail with reference to the drawings.

Figure 6:
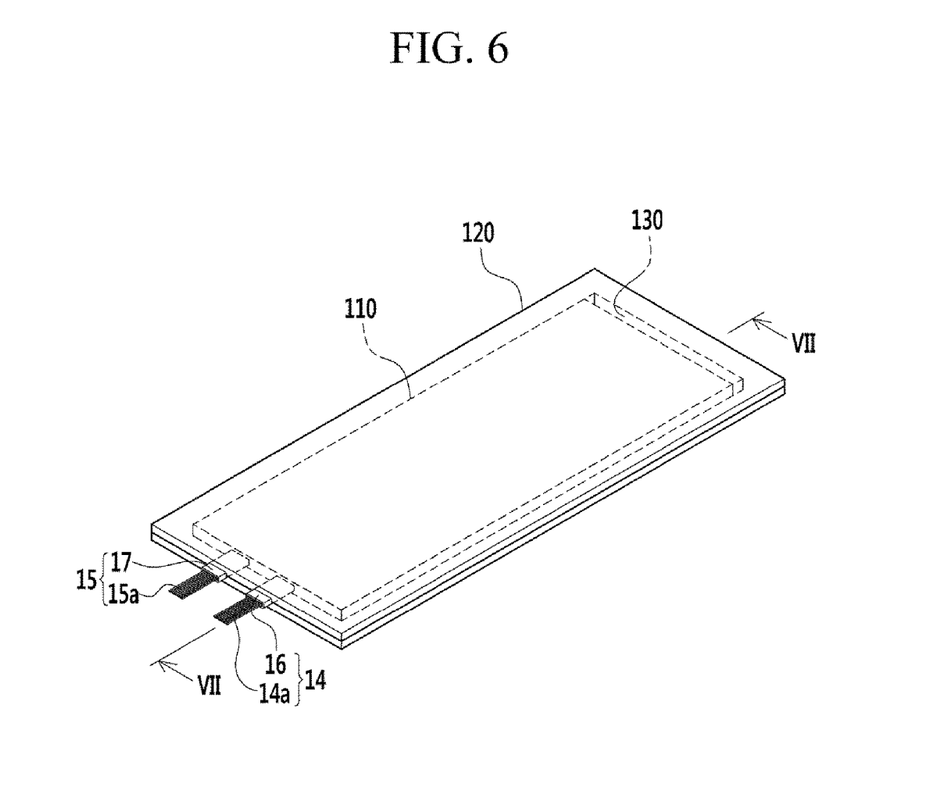
FIG. 6 is a perspective view of the rechargeable battery according to the exemplary embodiment of the present disclosure.
Figure 7:
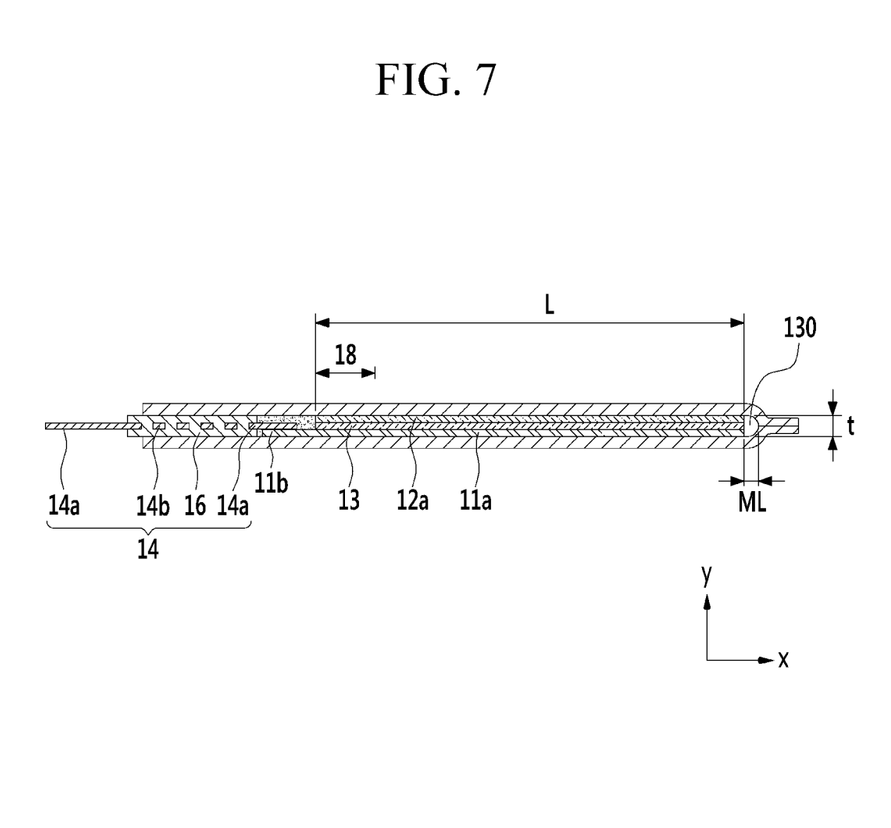
FIG. 7 is a cross-sectional view of FIG. 6 taken along the line VII-VII.
Figure 8:
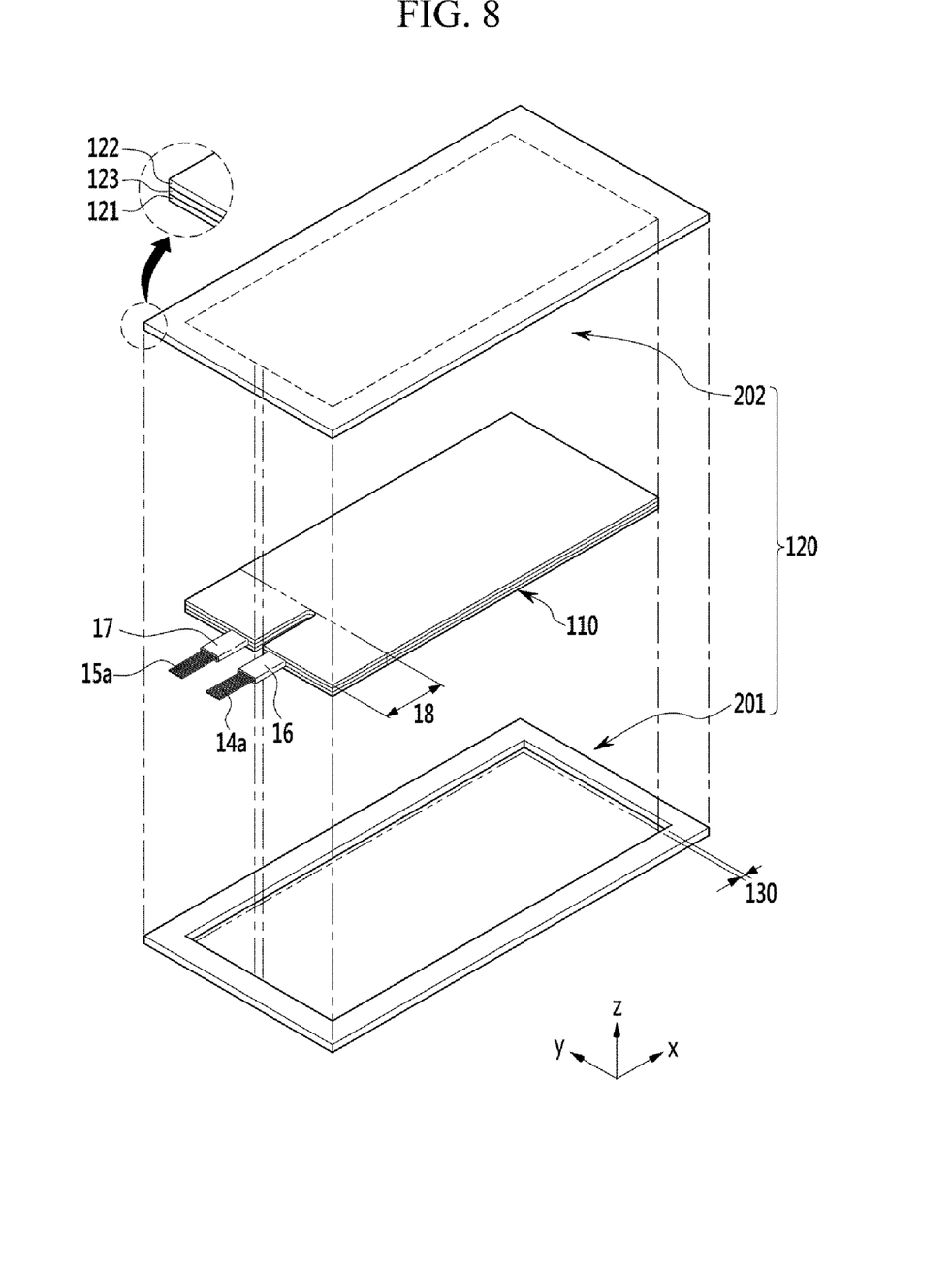
FIG. 8 is an exploded perspective view of the rechargeable battery of FIG. 6.
Figure 9:
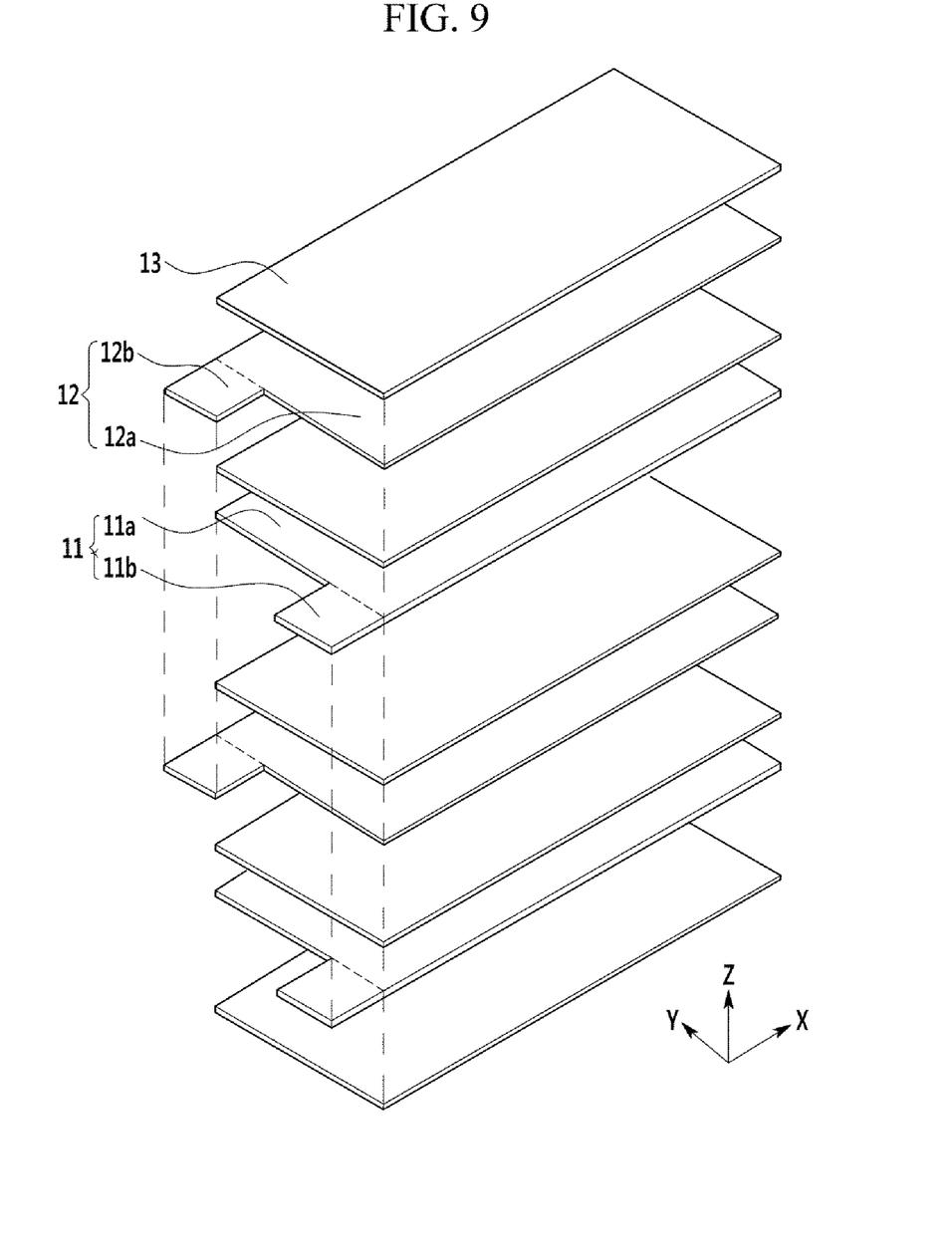
FIG. 9 is an exploded perspective view of the electrode assembly applicable to FIG. 8.

FIG. 6 is a perspective view of the rechargeable battery according to the exemplary embodiment of the present disclosure. FIG. 7 is a cross-sectional view of FIG. 6 taken along the line VII-VII, FIG. 8 is an exploded perspective view of the rechargeable battery of FIG. 6. FIG. 9 is an exploded perspective view of the electrode assembly applicable to FIG. 8.

As shown in FIGS. 6 and 5, the rechargeable battery according to the exemplary embodiment of the present disclosure includes: an electrode assembly 110; a case in which the electrode assembly 110 is accommodated (hereinafter, e.g., referred to as a pouch 120); and a margin portion 130 formed between the electrode assembly 110 and an inner surface of the pouch 120 to allow a length of the bent electrode assembly 110 to vary.

A first electrode tab 14 and a second electrode tab 15 can be the electrode tabs including the wire(s) that is illustrated in FIGS. 1 to 4, and for example, in FIG. 7, the electrode tab illustrated in FIG. 2 is shown. Accordingly, the first electrode tab 14 includes the wire having an adhesive portion 14a and a bent portion 14b and the insulating member 16 enclosing the wire, and the second electrode tab 15 includes a wire having an adhesive portion 15a and a bent portion and an insulating member 17 enclosing the wire.

Referring to FIGS. 8 and 9, the electrode assembly 110 is formed as a stacked type by interposing a separator 13 between a first electrode 11 and a second electrode 12 and then stacking all of them. The separator 13 can be made of a polymer film through which lithium ions can pass.

The electrode assembly 110 further includes a first electrode tab 14 and a second electrode tab 15 that are respectively connected to the first electrode 11 and the second electrode 12. The first and second electrode tabs 14 and 15 can be the electrode tabs that include the wire(s) illustrated in FIGS. 1 to 4.

The first and second electrode tabs 14 and 15 are drawn out of one end portion of the pouch 120 to form a tab gap (G) therebetween.

The first electrode 11, the second electrode 12, and the separator 13 are fixed by a fixing portion 18. The first electrode 11, the second electrode 12, and the separator 13 can be maintained such that they slip (or extend and contract, or slide) with respect to each other in portions where they are not fixed by the fixing portion 18.

The fixing portion 18 is formed by adhering a coated region 11a of the first electrode 11, the separator 13, and a coated region 12a of the second electrode 12 together by using an adhesive. For example, the fixing portion 18 is formed by a process such as applying an adhesive to the separator 13 corresponding to a coated region 11b and adhering the coated region 11a of the first electrode 11 thereto, applying an adhesive to the coated region 1 la and attaching the separator 13 thereto, applying an adhesive to the separator 13 corresponding to a coated region 12a and adhering the coated region 12a of the second electrode 12 thereto, and applying an adhesive to the coated region 12a and adhering the separator 13 thereto.

The fixing portion 18 can be formed by attaching the uncoated region 11b of the first electrode 11 and the separator 13 together and then attaching the uncoated region 12b of the second electrode 12 and the separator 13 together (not shown), and in this case, the separator 13 can include a protruding portion (not shown) such that it is attached to the respective uncoated regions 11b and 12b while overlapping them.

The margin portion 130 is formed opposite to the fixing portion 18 with respect to the electrode assembly 110. That is, the margin portion 130 is provided opposite to the fixing portion 18 and allows a length of the electrode assembly 110 to vary in a length direction (x-axis direction) of the rechargeable battery and the electrode assembly 110.

That is, the margin portion 130 allows the length of the bent electrode assembly 110 provided opposite to the fixing portion 18 to vary.

For example, the electrode assembly 110 has a characteristic length (L), a thickness (t), and an allowable curvature radius. The characteristic length (L) is a portion of the entire length of the electrode assembly 110a in the x-axis direction from which a length of the fixing portion 18 is subtracted. That is, the characteristic length (L) is the length of the portion that can directly slip (or slide into the margin portion 130) and be bent when a bending stress is applied to the electrode assembly 110.

The thickness (t) is a thickness of the portion of the electrode assembly 110 that corresponds to the characteristic length (L). That is, the thickness (t) is the thickness of the portion of the electrode assembly 110 that can directly slip (or slide into the margin portion 130) and be bent when a bending stress is applied to the rechargeable battery. The thickness (t) is a thickness that is calculated by subtracting a thickness of the pouch 120 from that of the rechargeable battery.

Since the bending stress increases the length and the increased length is accommodated by the margin portion 130, the electrode assembly 110 and the rechargeable battery can be bent in accordance with the bending stress. Accordingly, when the rechargeable battery is bent, a rupture does not occur in the rechargeable battery and a short-circuit is not generated.

In the current exemplary embodiment, the fixing portion 18 is formed opposite to the margin portion 130 since it is provided in the uncoated regions 11b and 12b. Though not illustrated, the fixing portion 18 can be formed in the middle of the electrode assembly 110 in the length direction thereof (x-axis direction). In this case, the electrode assembly 110 can be effectively bent by the bending stress if the fixing portion 18 is provided closer to the uncoated region.

Meanwhile, as the distance between the fixing portion 18 and the margin portion 130 becomes shorter, an allowable variable length range of the electrode assembly 110 can decrease. However, in the present disclosure, since the fixing portion 18 is formed in the uncoated region, a decrease in the allowable variable length range can be minimized. That is, when the bending stress is applied to the rechargeable battery, the electrode assembly 110 is bent, and in this case, the first electrode 11, the second electrode 12, and the separator 13 slide while being fixed in the fixing portion 18, thereby causing the length at a free end to increase or decrease. Accordingly, the electrode assembly 110 and the rechargeable battery can be easily bent.

Referring back to FIGS. 6 to 8, the first electrode 11 includes the coated region 11a where an active material is coated on a current collector including a thin metal plate, and the uncoated region 11b that is formed as an exposed current collector because an active material is not coated thereon. For example, a current collector and the first electrode tab 14 of the first electrode 11 are formed of aluminum (Al).

The second electrode 12 includes the coated region 12a where an active material different from the active material of the first electrode 11 is coated on a current collector including a thin metal plate, and the uncoated region 12b that is formed as an exposed current collector because an active material is not coated thereon. For example, a current collector and the second electrode tab 15 of the second electrode 12 are formed of copper (Cu).

While being stacked, the uncoated regions 11b and 12b of the first and second electrodes 11 and 12 are alternately arranged at opposite lateral sides in a width direction (y-axis direction). For example, the uncoated region 11b of the first electrode 11 is formed at a right side, while the uncoated region 12b of the second electrode 12 is formed at a left side.

The first electrode tab 14 is connected to the uncoated region 11b of the first electrode 11 through either one of the adhesive portions 14a formed at opposite ends of the first electrode tab, while the second electrode tab can be connected to the uncoated region 12b of the second electrode 12 through either one of the adhesive portions 15a formed at opposite ends of the second electrode tab. In this case, one of the adhesive portions 14a of the first electrode tab 14 can be adhered to one surface of the uncoated region 11b. In addition, one of the adhesive portions 15a of the second electrode tab 15 can be adhered to one surface of the uncoated region 12b. In this case, the adhesive portions 14a and 15a can be connected to the uncoated region 11b of the first electrode and the uncoated region 12b of the second electrode by welding. Accordingly, the first and second electrode tabs 14 and 15 form the tab gap (G) at one side of the pouch 120 outside thereof.

The pouch 120 has a flexible property and accommodates the electrode assembly 110, with its exterior portion thermo-bonded to form the rechargeable battery. In this case, the first and second electrode tabs are coated with the insulating members 16 and 17, and are drawn out of the pouch 120 through bonded parts. That is, the insulating members 16 and 17 electrically insulate the first electrode tab from the second electrode tab, and electrically insulate the first and second electrode tabs 14 and 15 from the pouch 120.

The pouch 120 can have a structure in which multiple sheets including the margin portion 130 are layered to enclose an exterior of the electrode assembly 110. For example, the pouch 120 includes a polymer sheet 121 that forms an inner side and performs insulating and thermo-bonding functions, a PET (polyethylene terephthalate) sheet that forms an exterior surface and performs a protecting function, a nylon sheet or a PET-nylon composite sheet 122 (hereinafter, for convenience, a "nylon sheet" will be exemplarily described), and a metal sheet 123 that provides mechanical strength. The metal sheet 123 is interposed between the polymer sheet 121 and the nylon sheet 122, and for example, can be formed as an aluminum sheet.

The pouch 120 includes a first exterior member 201 accommodating the electrode assembly 110, and a second exterior member 202 covering the electrode assembly 110 and thermo-bonded to the first exterior member 201 outside of the electrode assembly 110.

The first and second exterior members 201 and 202 can be formed to have the same structure in which the polymer sheet 121, the nylon sheet 122, and the metal sheet 123 are layered. Though not illustrated, the first and second exterior members can be sealed while interposing a gasket therebetween.

For example, the first exterior member 201 is formed to have a concave structure for accommodating the electrode assembly 110, and the second exterior member 202 is flatly formed to cover the electrode assembly 110 accommodated in the first exterior member 201. Though not illustrated, the second exterior member can be connected to the first exterior member.

Figure 10:
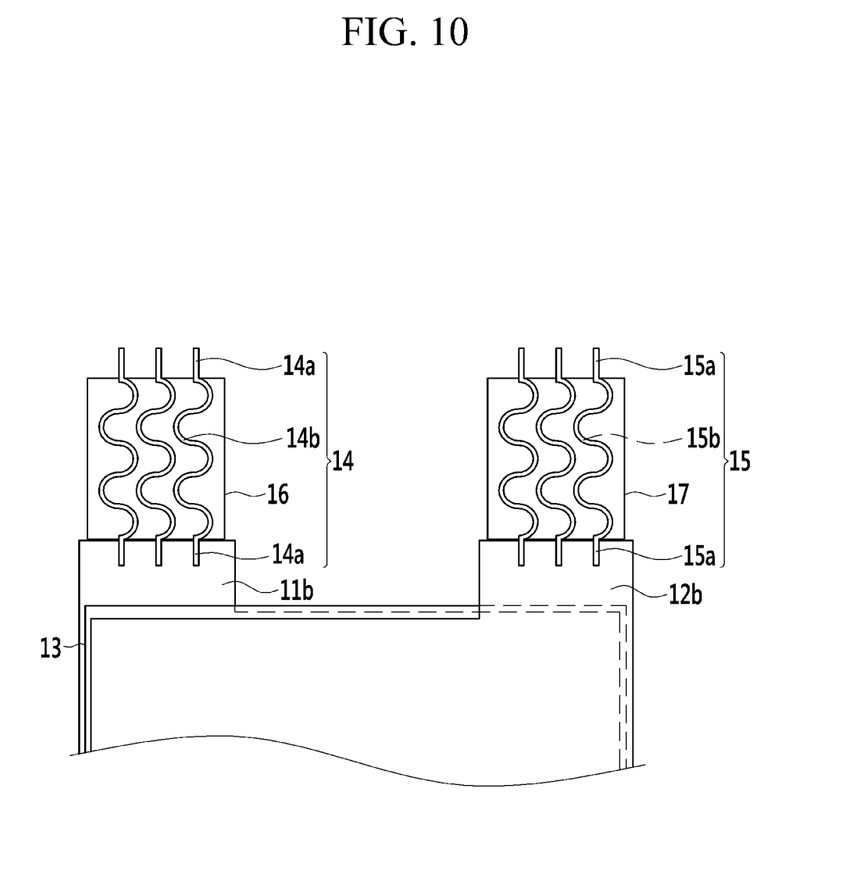
FIGS. 10 and 11 are partial, enlarged views of the rechargeable battery illustrating varied shapes of the electrode tab according to the exemplary embodiment of the present disclosure.
Figure 11:
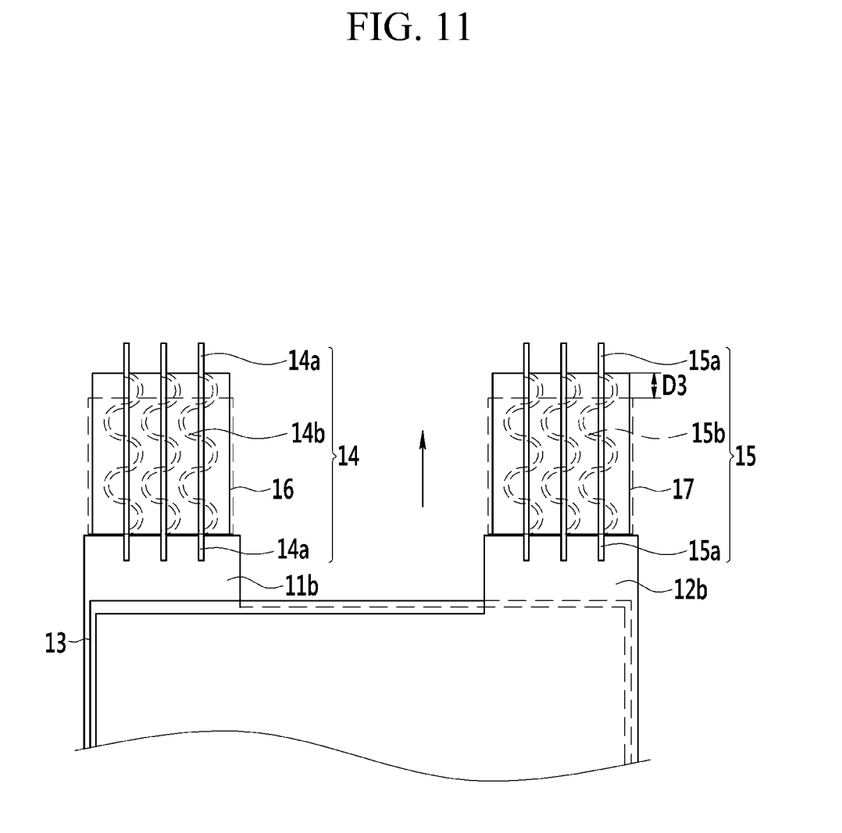

FIGS. 10 and 11 are partial, enlarged views of the rechargeable battery illustrating varied shapes of the electrode tab according to the exemplary embodiment of the present disclosure. In this case, FIG. 10 illustrates a state where a tensile force is not applied, while FIG. 11 illustrates a state where a tensile force is applied.

In FIG. 5, the electrode tab is bent, but in FIG. 11, the electrode tab is exemplarily described to be extended, for ease of understanding of the disclosure.

As shown in FIG. 10, the adhesive portions 14a and 15a of the electrode tabs 14 and 15 of the rechargeable battery according to the exemplary embodiment of the present disclosure are respectively connected to the uncoated regions 11b and 12b of the first and second electrodes 14 and 15.

As shown in FIG. 10, when the bending stress is not applied to the rechargeable battery, the bent portions 14b and 15b maintain their bends. In this case, the electrode tab can be the electrode tab of FIG. 2. Accordingly, the bent portions 14b and 15b of the wire can be curved to be substantially parallel to one surface of the uncoated region, and widths of the bent portions can be widths in a direction substantially parallel to one surface of the uncoated region.

Next, as shown in FIG. 11, when a tensile force is applied to the rechargeable battery (refer to an arrow direction), the insulating members 16 and 17 are extended to unbend the bent portions 14b and 15b such that the bends disappear.

In this case, the bends of the bent portions 14b and 15b are unbent and longer by a length D3 in a direction in which the insulating members 16 and 17 extend from the electrode assembly. When the lengths of the bent portion are formed to be the same as the maximum extended lengths of the insulating members 16 and 17, as shown in FIG. 10, the bent portions 14b and 15b can have a substantially straight line shape.

Subsequently, when the tensile force is not applied, the insulating members 16 and 17 are contracted, as shown in FIG. 10, and the bent portions 14b and 15b are restored to the shapes having the bends.

According to at least one of the disclosed embodiments, when the electrode tabs are formed to include the wire(s) having the bent portions, as in the exemplary embodiment of the present disclosure, the rupture(s) can be minimized or eliminated since the wire can be easily extended.

While the inventive technology has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A rechargeable battery, comprising:
   an electrode assembly including a first electrode, a separator, and a second electrode stacked together, wherein the first electrode, the separator, and the second electrode are fixed at a fixing portion on a first side of the electrode assembly;
   a case accommodating the electrode assembly; and
   first and second electrode tabs respectively connected to the first and second electrodes and extending from a first end portion of the case so as to form a tab gap therebetween,
   wherein each of the first and second electrode tabs includes:
      first and second adhesive portions opposing each other;
      at least one wire having a bent portion interconnecting the first and second adhesive portions, wherein the bent portion of the wire is configured to be unbent from an initial bent state based on a tensile force applied to the rechargeable battery, and restore to the initial bent state in response to the tensile force being removed; and
      an insulating member covering the bent portion.

2. The rechargeable battery of claim 1, wherein each of the first and second electrodes includes a coated region and an uncoated region extending from the coated region, and wherein the uncoated region is electrically connected to the first adhesive portion of the corresponding first or second electrodes tab.

3. The rechargeable battery of claim 2, wherein the bent portion of the at least one wire includes a plurality of bends extending in a direction substantially perpendicular to a surface of the corresponding uncoated region.

4. The rechargeable battery of claim 2, wherein the bent portion of the at least one wire is formed with a plurality of bends that are substantially parallel to one another.

5. The rechargeable battery of claim 1, wherein a surface of the first adhesive portion has a smooth surface.

6. The rechargeable battery of claim 1, wherein each of the first and second adhesive portions has a planar shape.

7. The rechargeable battery of claim 1, wherein the bent portion includes a plurality of bends connected between the first and second adhesive portions.

8. The rechargeable battery of claim 1, wherein the wire is formed of copper or aluminum.

9. The rechargeable battery of claim 1, wherein the insulating member is elastic and flexible.

10. The rechargeable battery of claim 9, wherein the insulating member is formed of a polymer material including silicon or a urethane.

11. The rechargeable battery of claim 9, further comprising a margin portion formed between a second side of the electrode assembly and an inner surface of the case such that the electrode assembly extends into the margin portion when the rechargeable battery is bent.

12. The rechargeable battery of claim 11, wherein the margin portion is formed opposite to the first and second electrode tabs with respect to the electrode assembly.

13. The rechargeable battery of claim 1, wherein the bent portion of the wire is configured to have a substantially straight line shape based on the tensile force applied to the rechargeable battery.

14. A rechargeable battery, comprising:
   an electrode assembly including first and second electrodes; and
   first and second electrode tabs respectively connected to the first and second electrodes and extending from the electrode assembly,
   wherein each of the first and second electrode tabs includes:
      an insulating member; and a wire including first and second adhesive portions formed on opposing ends of the insulating member and at least one non-linear portion formed in the insulating member connected to each of the first and second adhesive portions, wherein the non-linear portion of the wire is configured to be linear from an initial non-linear state based on a tensile force applied to the rechargeable battery, and restore to the non-linear state in response to the tensile force being removed.

15. The rechargeable battery of claim 14, wherein each of the first and second electrodes includes a coated region and an uncoated region extending from the coated region, and wherein the uncoated region is electrically connected to the first adhesive portion of the corresponding first or second electrodes tab.

16. The rechargeable battery of claim 14, wherein the non-linear portion includes a plurality of non-linear portions interconnecting the adhesive portions.

17. The rechargeable battery of claim 14, wherein the non-linear portion includes curved portions.

18. The rechargeable battery of claim 14, wherein the curved portion forms a substantially wave shape.

19. The rechargeable battery of claim 14, wherein the non-linear portion includes bent and non-curved portions.

20. The rechargeable battery of claim 19, wherein the non-curved portions have a substantially saw tooth shape.

21. The rechargeable battery of claim 14, wherein the non-linear portion comprises a plurality of non-linear portions substantially parallel to each other.

* * * * *